(12) United States Patent
Little et al.

(10) Patent No.: US 8,634,684 B2
(45) Date of Patent: Jan. 21, 2014

(54) ANTI-RESONANT WAVEGUIDE BENDS

(75) Inventors: Brent E. Little, Glen Head, NY (US);
Peter W. Evans, Mountain House, CA (US)

(73) Assignee: Infinera Corporation, Sunnyvale, CA (US)

( * ) Notice: Subject to any disclaimer, the term of this patent is extended or adjusted under 35 U.S.C. 154(b) by 33 days.

(21) Appl. No.: 12/828,129

(22) Filed: Jun. 30, 2010

(65) Prior Publication Data

US 2012/0002920 A1 Jan. 5, 2012

(51) Int. Cl.
*G02B 6/26* (2006.01)
*G02B 6/42* (2006.01)

(52) U.S. Cl.
USPC .............................................. 385/32; 385/129

(58) Field of Classification Search
USPC .................................... 385/32, 130
See application file for complete search history.

(56) References Cited

U.S. PATENT DOCUMENTS

| | | | |
|---|---|---|---|
| 6,546,161 B2 * | 4/2003 | Okuno et al. | 385/14 |
| 2001/0024547 A1 * | 9/2001 | Huang et al. | 385/32 |
| 2011/0317960 A1 * | 12/2011 | Van Keuren et al. | 385/50 |

* cited by examiner

*Primary Examiner* — Eric Wong
(74) *Attorney, Agent, or Firm* — Ross M. Carothers; David L. Soltz

(57) ABSTRACT

The present invention provides a system, apparatus and method to maintain the polarization state of an optical signal propagating within a photonic integrated circuit, or from a first photonic integrated circuit to a second photonic integrated circuit. According to various embodiments of the invention, an optical circuit is provided which includes a waveguide having one or more bends or curved portions. The bends or curved portions of the waveguide are configured to maintain the polarization orientation of the optical signal as the optical signal propagates through the waveguide, such that the polarization orientation at inputs or outputs, or at various points along the waveguide is known. Embodiments of the present invention mitigate polarization crosstalk, which in turn provides for improved processing efficiency.

7 Claims, 7 Drawing Sheets

ANTI-RESONANT WAVEGUIDE BENDS

BACKGROUND OF THE INVENTION

1. Field of the Invention

This invention relates generally to optical transmission systems and, more particularly, to polarization control in optical transmission systems.

2. Description of the Related Art

Optical circuits, for example photonic integrated circuits (PICs), are often designed to operate on one or more specific polarization states of an optical signal. For example, PICs may be designed to perform a first function on a first polarization state of the optical signal and a second function on a second polarization state of the optical signal. These polarization states may include orthogonal modes, such as the transverse electric (TE) mode and the transverse magnetic (TM) mode. The TE and TM modes may be processed by two separate optical circuits, as part of a PIC. For example, a first circuit may be designed to operate on the TE mode of an optical signal, while a second optical circuit may be designed to operate on the TM mode of the optical signal. While the TE and TM modes are orthogonal with respect to themselves, under certain circumstances they may rotate, with respect to a longitudinal axis of a waveguide for example. For example, polarization rotation may occur in waveguide bends or curved portions. Optical circuits may include hundreds of such bends or curved portions to interconnect optical signals with the various optical elements of the optical circuit. Therefore, optical signals propagating through optical circuits having numerous curved portions may be subjected to polarization rotation due to such curved portions. Polarization rotation may lead to performance degradation in the PIC, and ultimately the associated optical system. Therefore, it may be desirable to maintain the polarization orientation of an optical signal as the optical signal propagates through an optical circuit, such as a PIC.

What is needed is an optical circuit which can maintain the polarization orientation of an optical signal as the optical signal propagates through the optical circuit, which may include one or more bends or curved portions.

SUMMARY OF THE INVENTION

The present invention provides a system, apparatus and method to maintain the polarization state of an optical signal propagating within a photonic integrated circuit, or from a first photonic integrated circuit to a second photonic integrated circuit. According to various embodiments of the invention, an optical circuit is provided which includes a waveguide having one or more bends or curved portions. The bends or curved portions of the waveguide are configured to maintain the polarization orientation of the optical signal propagating through the waveguide. According to certain aspects of the invention, a curved portion of the waveguide is configured such that a first polarization orientation of the optical signal as it enters the curved portion is substantially the same as a second polarization orientation of the optical signal as it exits the curved portion. For example, the first polarization mode may be perpendicular with a centerline of the waveguide at an input of the curved portion, or parallel with the centerline of the waveguide at the input of the curved portion. Alternatively, the first polarization mode may be neither parallel nor perpendicular with the centerline of the waveguide at the input of the curved portion.

According to other aspects of the invention, a curved portion of a waveguide is configured such that a first polarization orientation of the optical signal as it enters the curved portion is different than a second polarization orientation of the optical signal as it exits the curved portion. For example, the first polarization mode may neither be perpendicular nor parallel to a centerline of the waveguide at an input of the curved portion, but the first polarization mode may be perpendicular or parallel to a centerline of the waveguide at an output of the curved portion.

According to still further aspects of the invention, a plurality of curved portions, as part of an optical circuit for example, may be configured such that a first polarization orientation of the optical signal at an input of a first of the plurality of curved portions may be converted into a second polarization orientation at an exit of a last of the plurality of curved portions. In certain embodiments, the first and second polarization orientations are substantially the same.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

The present invention provides a system, apparatus and method to maintain the polarization state of an optical signal propagating through an optical circuit, such as a photonic integrated circuit, which may include one or more bends or curved portions.

The following description is set forth for purpose of explanation in order to provide an understanding of the invention. However, it is apparent that one skilled in the art will recognize that embodiments of the present invention, some of which are described below, may be incorporated into a number of different systems and devices.

Reference will now be made in detail to the present exemplary embodiments, which are illustrated in the accompanying drawings.

Figure 1:
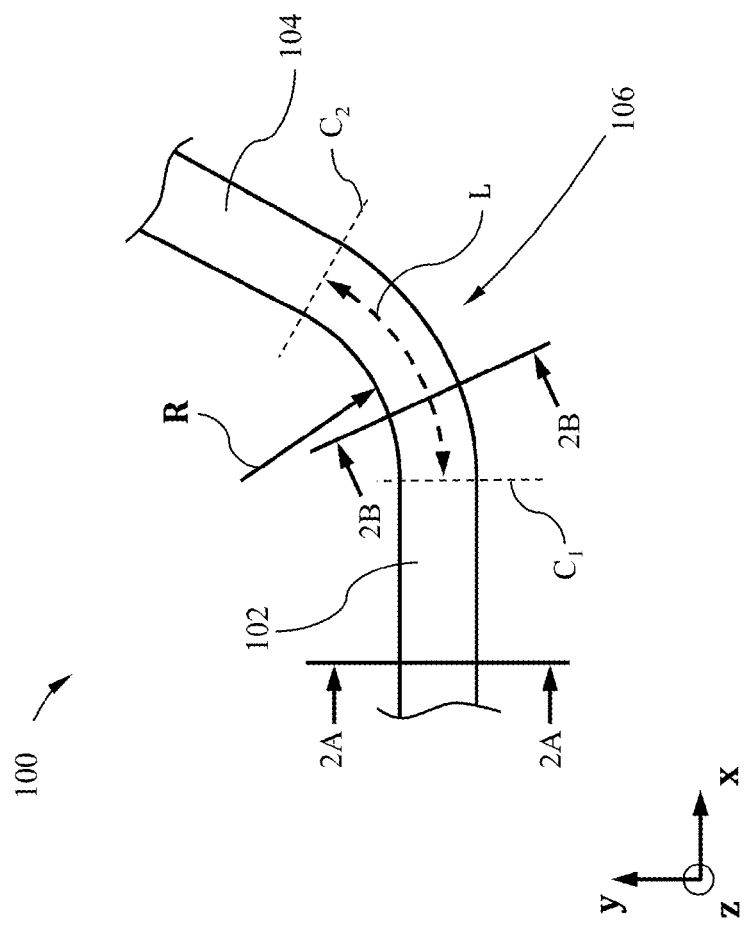
FIG. 1 depicts a top planar view of an exemplary waveguide which includes a curved portion, consistent with certain aspects of this disclosure.

Turning now to FIG. 1, an exemplary waveguide 100, consistent with certain aspects of the present invention, includes first and second straight portions 102, 104 and a bend or curved portion 106. The curved portion 106 of the waveguide 100 includes an input plane $C_1$, and an output plane $C_2$. While the curved portion 106 is shown interconnecting straight portion 102 with 104, this is for illustration purposes only. Curved portion 106 may, for example, interface with other curved portions (not shown). The radius of curvature of these other curved portions may be the same or different than the radius of curvature of the curved portion 106. Curved portion 106 has a radius of curvature of indicated by arrow R, and has an arc-length of L measured between the input and output planes $C_1$, $C_2$.

Figure 2:
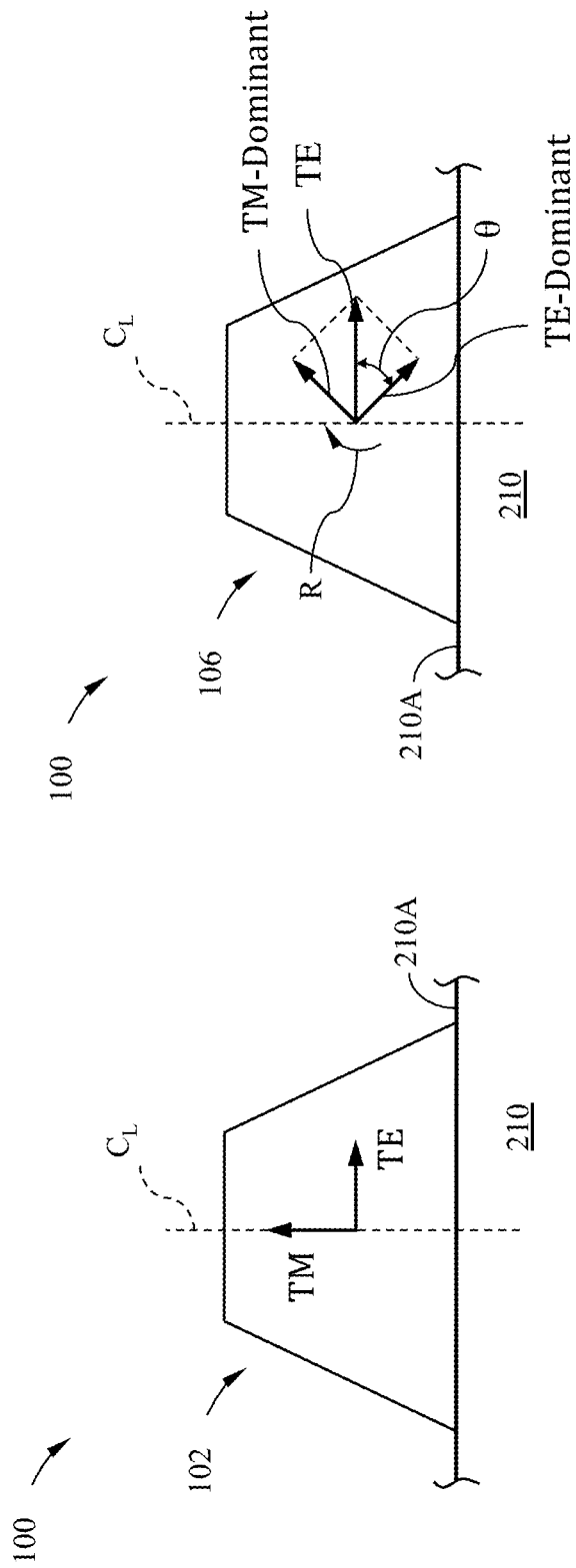
FIG. 2A depicts the orientation of the polarizations of the two eigenmodes of an optical signal propagating in a straight waveguide.
FIG. 2B depicts the orientation of the polarizations of the two eigenmodes of an optical signal propagating in a curved waveguide.

FIG. 2A depicts a cross section view of waveguide 100 along a line 2A of FIG. 1. Waveguide 100 is provided on substrate 210 and includes a centerline $C_L$ which runs perpendicular to the substrate surface 210A, bisecting the waveguide 100. Eigenmodes of straight waveguides, such as straight portion 102 of waveguide 100, are typically oriented along or consistent with the TE and TM mode. Thus, a first eigenmode exists along the TE mode and a second eigenmode exists along the TM mode. As an optical signal propagates in the straight portion 102 of waveguide 100 from the lines 2A toward the input plane $C_1$, the orientation of the first and second eigenmodes is maintained. Thus, at the input plane $C_1$ the orientation of the first and second eigenmodes is similar or consistent with the TE and TM mode, as shown in FIG. 2A.

FIG. 2B represent the cross section of the curved portion 106 of waveguide 100 along the line 2B of FIG. 1. As discussed with respect to the cross section view of FIG. 2A, the waveguide 100 is provided on substrate 210 and includes a centerline $C_L$ which is perpendicular to the surface 210A of the substrate, bisecting the waveguide 100. As depicted in FIG. 2B, the orientation of the first and second eigenmodes along a length of a curved portion of a waveguide, such as curved portion 106 of waveguide 100, may have orientations that are neither purely TE nor purely TM. For example, the eigenmodes of the propagating optical signal may have polarization orientations which may be rotated an angle θ degrees, as indicated by arrow R. The angle θ depends on the geometric characteristics of the curved portion 106, such as the width of the curved portion 106, the index of the material of the curved portion 106, as well as the radius of curvature of the curved portion 106, as discussed in greater detail below.

The eigenmodes, as vector quantities, can be summed to obtain that portion of the eigenmodes which contributes to the TE mode and the TM mode. As shown, for example the vectors of each eignemodes, labeled TM-Dominant and TE-Dominant, can be summed to provide that portion of the eigenmodes which contribute to the TE mode of an optical signal propagating through the curved portion 106. An optical signal propagating through waveguide 100 from the straight portion 102 passes the input plane $C_1$, and into the curved portion 106. Since the first and second eigenmodes associated with the curved portion 106 have different propagation constants, e.g. they propagate along the curved portion 106 at slightly different velocities, the vector sum of the eigenmodes rotates along the arc length L. As the optical signal propagates through the curved portion 106, the vector sum of the eigenmodes continue to rotate until the optical signal reaches the output plane $C_2$ and passes into straight portion 104, upon which the eigenmode orientations may be maintained throughout the length of the straight portion 104. The TE-like and TM-like modes propagate around the waveguide bend with different phase velocities until they arrive at the output plane $C_2$ of the curved portion 106. As mentioned above, the resultant field at the output plane is a vector sum of the eigenmodes, and will in general be a field that is not purely TE or TM oriented. Some degree of polarization rotation has therefore occurred and there is now power in both the TE and TM modes.

By paying close attention to the geometric characteristics of the curved portion 106, the orientation of the polarization modes of the eigenmodes can be determined at the input plane $C_1$ and the output plane $C_2$. More specifically, knowing the orientation of the polarization modes at the input plane $C_1$, a desired polarization mode can be achieved at the output plane $C_2$ of the curved portion 106. Thus, it is possible to fabricate a waveguide, including multiple curved portions separated by straight portions, which provides a desired polarization mode orientation at its output, the desired polarization mode dependent upon the input polarization mode orientation for example. The curved portion 106 of the waveguide 100 supports two eigenmodes, a first eigenmode having a first propagation constant B1 and a second eigenmode having a second propagation constant B2, where by definition we set B1 greater than B2. Each of the propagation constants B1, B2 depend on the waveguide geometry, as well as the radius of curvature, of the curved portion 106. An anti-resonant bend or curved portion may be configured to have an arc length defined as:

$$L=2N*Lb \qquad (1)$$

where Lb is a beat length and N is an integer. As mentioned above, each of the two eigenmodes propagates at slightly different velocities in the curved portion 106. Thus, the phase relationship of each of the two eigenmodes is always changing, for example the phase of a first of the two eigenmodes shifting with respect to the phase of a second of the two eigenmodes. The beat length is that portion of the arc length L of the curved portion 106 where the phase difference between the first and second eigenmode is a multiple of π. Thus, when the length of the curved portion 106 of waveguide 100 has a length of twice the beat length, the orientation of the polarization modes at the output plane $C_2$ are an exact copy of the orientation of the polarization modes at the input plane $C_1$. In other words, while the curved portion 106 may induce rotation of the polarization modes, the orientation of the polarization modes at the output plane are identical to the orientation of the polarization modes at the input plane $C_1$. The beat length may be calculated as follows:

$$Lb = \frac{\pi}{(B1-B2)} \qquad (2)$$

where B1 and B1 are the propagation constants of the first and second eigenmodes, respectively. Substituting Lb of equation (2) into equation (1) above results in:

$$L = \frac{2N\pi}{(B1 - B2)} \quad (3)$$

The curved portion 106 can be designed to have an arc length L equal to two beat lengths by selecting the appropriate radius of curvature R, the physical arc length L itself, and/or by varying the waveguide geometry so that the propagation constants B1 and B2 are modified in such a way as to achieve a desired beat length to maintain a desired orientation of the polarization modes at the output plane $C_2$ of the curved portion 106.

Figure 3:
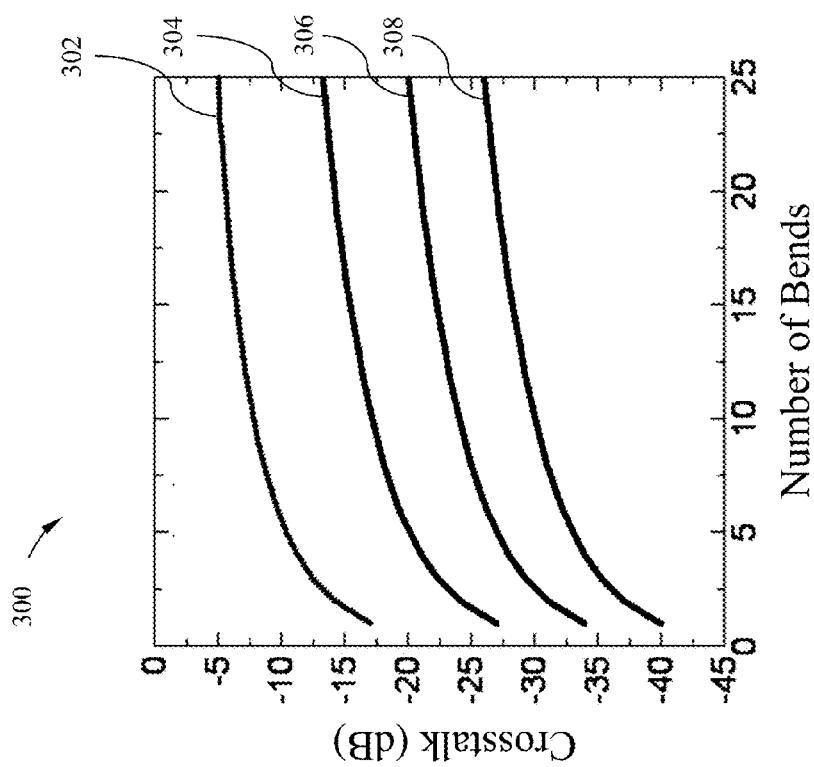
FIG. 3 is a graph depicting average polarization cross-talk in an optical circuit as a function of the number of bends in the corresponding optical circuit, consistent with certain aspects of this disclosure.

An optical circuit including a series of curved sections can progressively and undesirably change the polarization state of an optical signal propagating through the optical circuit. For example, consider waveguide curved portions which support eigenmodes in the curved portions which are tilted by θ=5° with respect to the TE axis, e.g. as depicted as arrow TE in FIG. 2A. These undesirable changes in the polarization state result in polarization cross-talk, at an output of the optical circuit for example. For purposes herein, polarization cross-talk means the amount of power in the unwanted polarization state. Thus, if the propagating optical signal is TE polarized, then the unwanted polarization state is TM polarized and the polarization cross-talk is the amount of power in the TM polarized portion of the optical signal. FIG. 3 is a graph 300 depicting a first curve 302 which represents the polarization cross-talk versus the number of bends or curved portions in a corresponding optical circuit, the arc lengths of the curved portions being random. As shown, the cross-talk rises with an increasing number of bends or curved portions in the optical circuit. Typically, a cross-talk above −10 dB is unacceptable, resulting in errors in processing the propagating optical signal for example. As depicted in curve 302, in the case of the curved portions having arbitrary arc lengths, −10 dB of crosstalk is reached after only 7 bends or curved portions.

Unlike the first curve 302 where the arc-lengths of the associated bends are completely random from bend to bend, second, third and fourth curves 304, 306, 308 represent crosstalk versus the number of bends in an exemplary optical circuit where the bends are designed to have arc lengths closer to an ideal value in order to preserve the polarization state of an optical signal propagating through the exemplary optical circuit, e.g. closer to the two beat length values. As mentioned above, the waveguide geometry or the length of the curved portions of the waveguide may be designed so that the length of each of the curved portions are configured to be close to the ideal anti-resonant length of a multiple of two polarization beat lengths long. In practice, design constraints may not allow all bends to be exactly multiples of two beat lengths. However, by designing close to the ideal on average, polarization crosstalk can still be considerably reduced. Accordingly, curve 304 represent a higher degree of design accuracy to the ideal anti-resonant design as compared to curve 302. For example, each of the bends associated with the exemplary optical circuit may have lengths within an acceptable error range, or a first group of the bends or curved portions may be very close to the ideal length to minimize polarization crosstalk, as compared to a second group of the bends or curved portions. Curves 306 and 308 represent higher degrees of design accuracy to the ideal anti-resonant design as compared to curves 304 and 306, respectively. More specifically, curve 304 represents the case where each bend is nominally a multiple of two beat lengths in length, however due to fabrication and/or design constraints there is still a random error of approximately 25% of one beat length, or a random error of $$\pm \frac{Lb}{4}.$$

As compared to curve 302 associated with the optical circuit design incorporating random bend lengths, curve 304 represents a crosstalk reduction of about 8 dB. Curve 306 is similar to the curve 304, however the randomness of each bend or curved portion as part of the optical circuit is reduced to $$\pm \frac{Lb}{9}.$$

Finally, curve 308 is similar to curve 304, however the randomness of each bend length is further reduced to $$\pm \frac{Lb}{18}.$$

As depicted in graphs 304, 306 and 308, as the randomness of the anti-resonant bends or curved portions as part of an optical circuit are reduced, the polarization crosstalk is likewise improved. Thus, while design constraints may limit the use of bends or curved portions which are ideal, for example where a bend radius may need to be within a range in order to physically integrate into the design of the optical circuit, nonetheless the bends or curved portions may be designed as close as possible to the ideal and provide advantageous results. For example, with respect to curve 304, if an optical circuit having 25 bends or curved portions, such as curved portions 106, ideal anti-resonant bends or curved portions may not be necessary to provide less than −10 dB of crosstalk.

Figure 5:
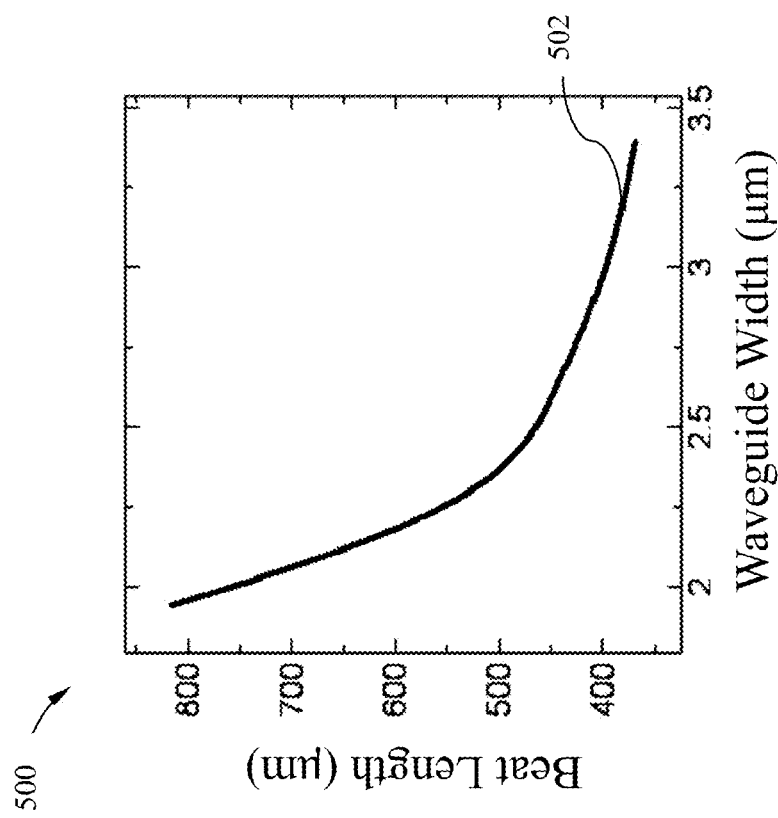
FIG. 5 is a graph depicting polarization beat length values as a function of the width of an exemplary waveguide, such as the exemplary waveguide of FIG. 4, consistent with certain aspects of this disclosure.
Figure 4:
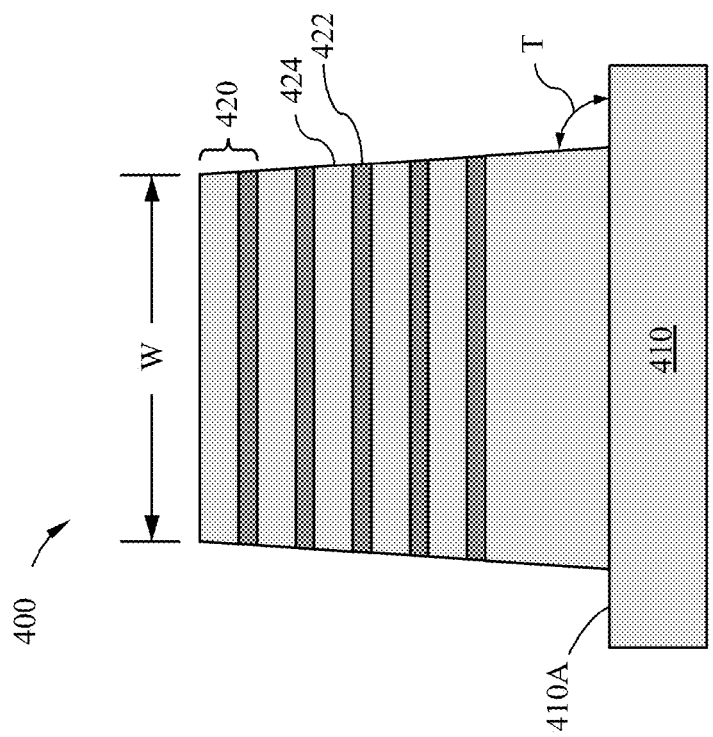
FIG. 4 depicts an exemplary waveguide cross section geometry, consistent with certain aspects of the this disclosure.

Changing the waveguide geometry may change the beat length, Lb, and therefore affords an extra degree of freedom to the circuit designer. As mentioned above, bends or curved portions as part of an optical circuit can provide improved polarization crosstalk performance by choosing the radius or curvature R, or the arc-length L of the bends to satisfy L=2N*Lb, e.g. equation (1) above. The width of the bend or curved portion of a waveguide may also be modified to provide the desired outcome, satisfying equation (1) for example. Referring to FIG. 4, an exemplary Indium Phosphide (InP) waveguide may be fabricated to include alternating layers 420 of InP 422, which may have an index 3.13 for example, and InP-alloy 424, which may have an index of 3.165 for example. The nominal operating wavelength may be λ=1.55 μm. The fabricated waveguide has a width w which may be determined, for example, by the mask width used in the fabrication steps. The etch process may induce a tilt T on the waveguide walls, for example a tilt of 97° with respect to the surface 410A of substrate 410. The tilt depicted in FIG. 4 is for illustration purposes only, and the actual tilt may be more or less than shown. Now turning to FIG. 5, with a bend radius R of about 200 μm, for example the bend radius R of curved portion 106 of the embodiment of FIG. 1, the graph 500 depicts a curve 502 of the calculated beat length, Lb, as a function of waveguide width w. As shown by the curve 502, the beat length may change by a factor of two as the width, w, changes from about 2 μm to about 3.5 μm. Thus, waveguide width, radius of curvature, and arc-length, are three degrees of freedom an optical circuit designer may use to optimize bends and circuits for low polarization cross-talk.

Figure 6:
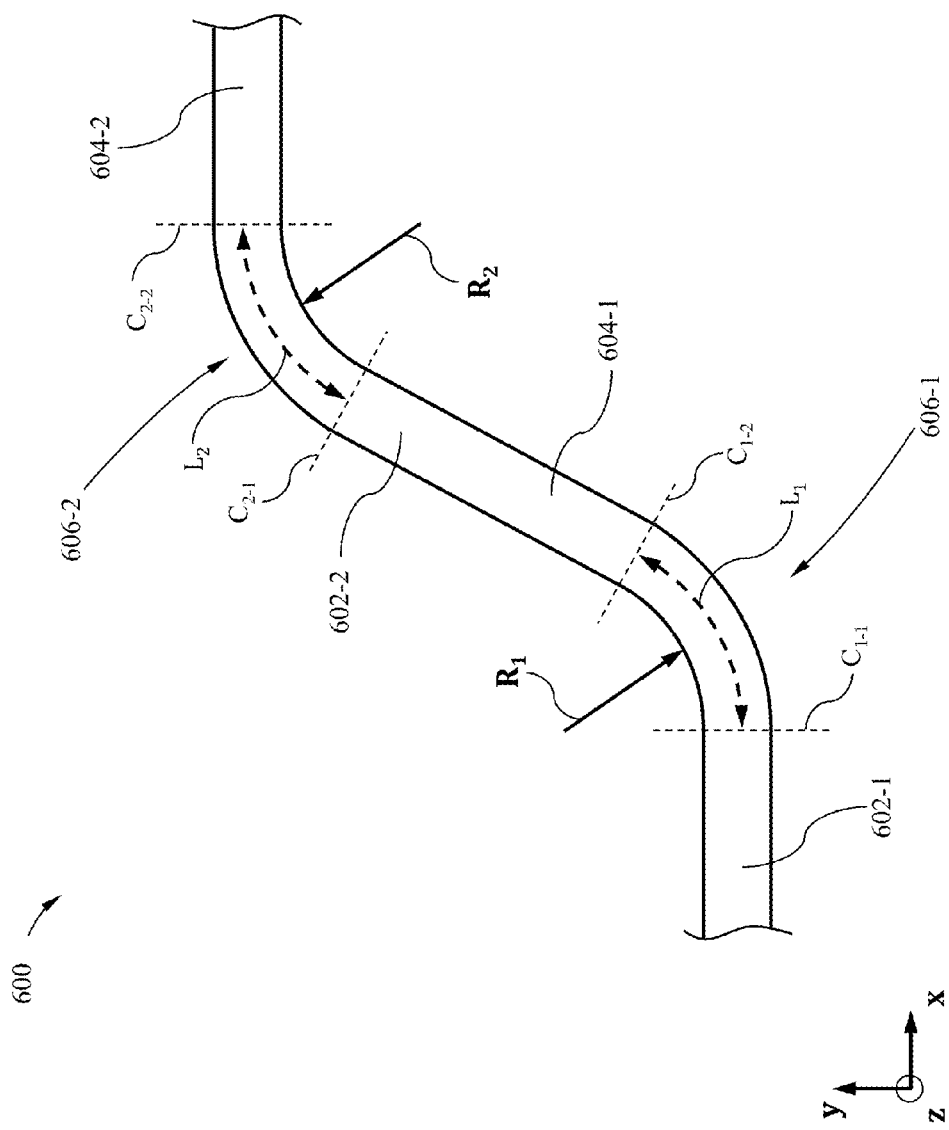
FIG. 6 depicts another exemplary waveguide including multiple bends or curved portions, consistent with certain aspects of this disclosure.

As mentioned above, a waveguide may include multiple bends or curved portions, along with straight portions between some or all of the bends. These bends or curved portions may act singularly to maintain a desired polarization state of a propagating optical signal at an output of each bend, consistent with a TE or TM polarization state for example. Alternatively, these bends or curve portions may cooperate with each other to achieve a desired polarization state of an optical signal at an output of the optical circuit itself. The orientation of the polarization states at the outputs of each bend or curved portion may or may not be consistent with a TE or TM polarization state for example. The orientation of the polarization state of the propagating optical signal may rotate and couple to other polarization states while propagating through the bends or curved portions from an input to a first bend to an output of a last bend. When the propagating optical signal reaches the output, the orientation of the polarization state of the propagating optical signal at the output will be similar to the orientation of the polarization state at the input. With reference to FIG. 6, a waveguide 600 is shown to include a first bend or curved portion 606-1 and a second curved portion 606-2 separated by a straight section 604-1. The first bend 606-1 includes an input geometric plane $C_{1-1}$ coupled to an input waveguide 602-1 and an output geometric plane $C_{1-2}$ coupled to the waveguide 604-1. The first bend 606-1 includes an arc length $L_1$ and a radius of curvature $R_1$. Waveguide 604-1 couples light received from bend 606-1 to bend 606-2. Similar to bend 606-1, bend 606-2 includes an input geometric plane $C_{2-1}$ and an output geometric plane $C_{2-2}$ coupled to a waveguide 604-2. The second bend 606-2 includes an arc length $L_2$ and a radius of curvature $R_2$. Consistent with this disclosure, the width, arc length, or radius of curvature of each of the first and second bends can be configured such that each of the bend 606-1, 606-2 maintains a desired orientation of the polarization state of a propagating optical signal. For example, bend 606-1 may be configured to provide the same orientation of the polarization state of a propagating optical signal at the output geometric plane $C_{1-2}$ as provided at the input geometric plane $C_{1-1}$. Similarly, bend 606-2 may be configured to provide the same orientation of the polarization state of a propagating optical signal at the output geometric plane $C_{2-2}$ as provided at the input geometric plane $C_{2-1}$. Since the straights portions 602-1, 604-1, and 604-2 will maintain the orientation of the polarization state of the propagating optical signal, the orientation of the propagating optical signal at the output plane $C_{2-1}$ will be substantially the same as provided at the input plane $C_{1-1}$.

Alternatively, the width, w, arc length, L, or radius of curvature, R, of each of the first and second bends 606-1, 606-2 can be configured such that, collectively, the bends 606-1, 606-2 maintain a desired orientation of the polarization state of a propagating optical signal at an output of the optical circuit, for example at the output plane $C_{2-1}$ of bend 606-2. Thus, bend 606-1 may be configured to provide a first orientation of the polarization state of the propagating optical signal at the output plane $C_{1-2}$, the first orientation being different than the orientation at the input plane $C_{1-1}$ for example. Bend 606-2 may be configured to provide a second orientation of the polarization state of the propagating optical signal at the output plane $C_{2-2}$, the second orientation being different than the first orientation for example, e.g. the orientation of the polarization state at the input plane $C_{2-1}$. Although perhaps different than the first orientation, the second orientation of the polarization state of the propagating optical signal may be similar to the orientation of the propagating signal at the input plane $C_{1-1}$. The waveguide 600 may further include a plurality of bends or curved portions, the first and second curved portions 606-1, 606-2 being first and second of the plurality of bends for example.

Figure 7:
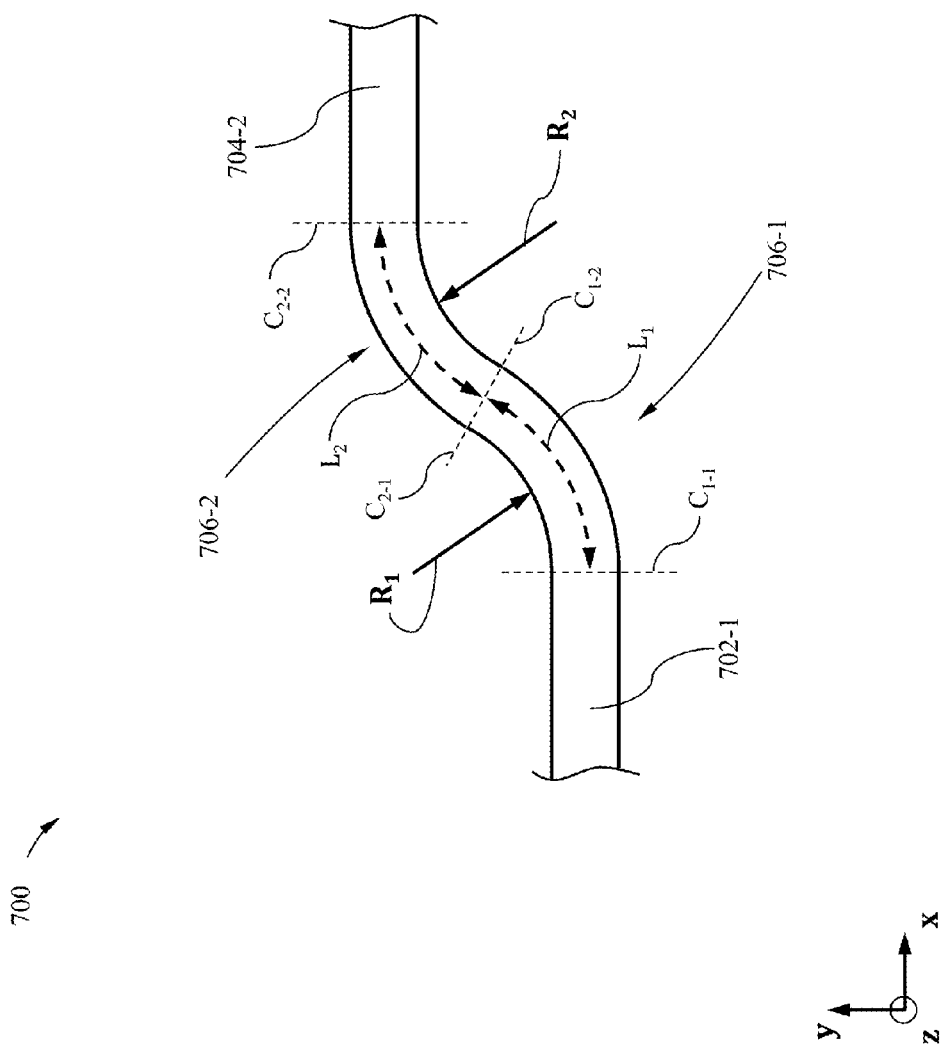
FIG. 7 depicts yet another exemplary waveguide including multiple bends or curved portions, consistent with certain aspects of this disclosure.

Turning to FIG. 7, a waveguide 700 similar to waveguide 600 is depicted, however waveguide 700 does not include a straight portion coupling a first bend 706-1 with a second bend 707-1. Rather, an output geometric plane $C_{1-2}$ of bend 706-1, also referred to as input geometric plane $C_{2-1}$ of bend 706-2, couples bend 706-1 directly with bend 706-2. Bend 706-1 also includes an input geometric plane $C_{1-1}$ which couples the straight portion 702-1 to the bend 706-1, and a radius of curvature $R_1$ and an arc length $L_1$. Bend 706-2 also includes an output geometric plane $C_{2-2}$ which couples to a straight portion 704-1, and a radius of curvature $R_2$ and an arc length $L_1$. The bends 706-1, 706-2 of waveguide 700 may be configured to individually preserve the orientation of the polarization state of an optical signal propagating through the waveguide 700, e.g. the orientation of the polarization state at the input geometric plane $C_{1-1}$, $C_{2-1}$ being similar to the orientation of the polarization state at the corresponding output geometric plane $C_{1-2}$, $C_{2-2}$, respectively. Thus, the orientation of the polarization state of an optical signal at the output geometric plane $C_{2-2}$, and entering straight portion 704-2, is similar to the orientation of the polarization state of the optical signal at the input geometric plane $C_{1-1}$.

Figure 8:
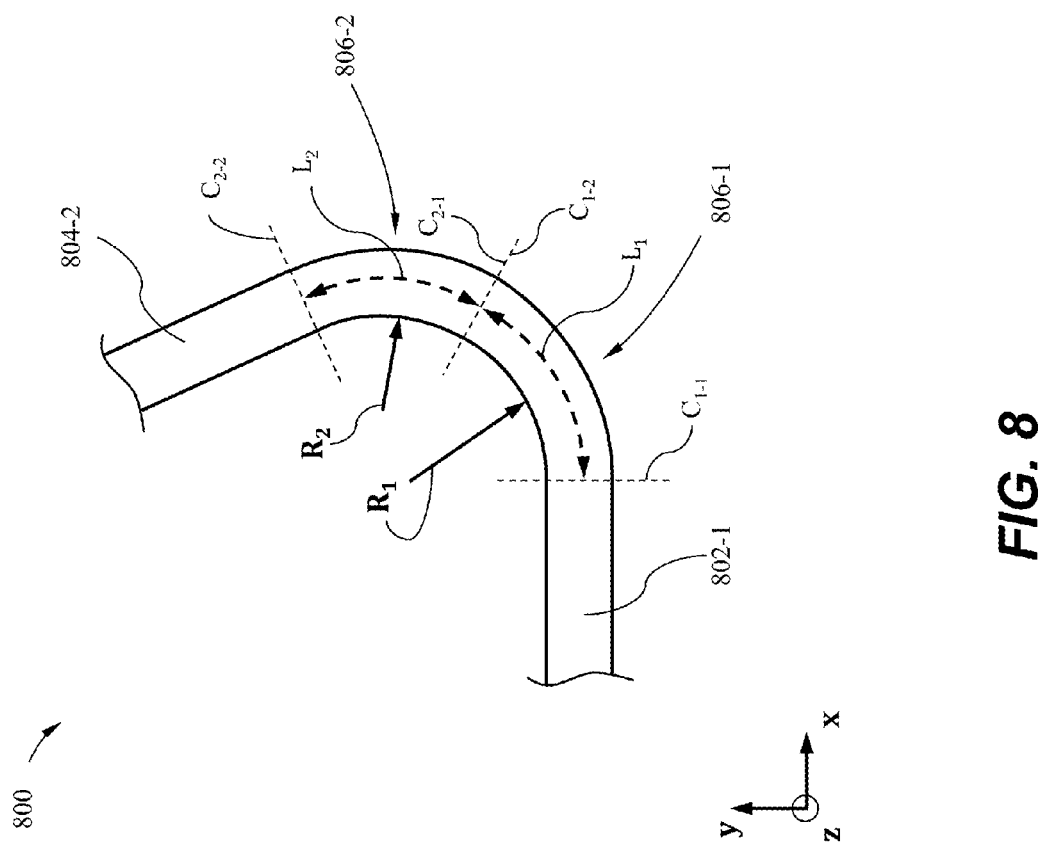
FIG. 8 depicts still another exemplary waveguide including multiple bends or curved portions, consistent with certain aspects of this disclosure.

Turning to FIG. 8, another exemplary waveguide 800, similar to the waveguide 700, includes first and second adjacent bends or curved portions 806-1, 806-2. However, in order to provide a desired orientation of the polarization state of a propagating optical signal at an output plane $C_{2-1}$ of bend 806-2 as compared to an input geometric plane $C_{1-1}$ of bend 806-1, a radius of curvature $R_1$ of the bend 806-1 is different than the radius of curvature $R_2$ of the bend 806-2. Waveguide 800 includes a straight portion 802-1 which couples to the input geometric plane C1-1 of the bend 806-1. Bend 806-1 includes an arc length $L_1$ and ends in an output geometric plane $C_{1-2}$, which also acts as the input geometric plane $C_{2-1}$ of bend 806-2. Bend 806-2 includes an arc length $L_2$, ending in the output geometric plane $C_{2-2}$ which couples to a straight portion 804-2. While the bends 806-1, 806-2 are depicted as two separate bends or curved portions, bends 806-1, 806-2 may be referred to as a single bend 806 having geometric dimensions commensurate with bens 806-1 and 806-2. Alternatively, the waveguide 800 may include one or more additional straight portions, one of which may be positioned between the bends or curved portions 806-1, 806-2, coupling the output geometric plane $C_{1-2}$ with the input geometric plane $C_{2-1}$. As with waveguide 700, the bends 806-1, 806-2 of waveguide 800 may individually preserve the orientation of the polarization state of an optical signal propagating through the waveguide 800, e.g. the orientation of the polarization state at the input geometric plane $C_{1-1}$, $C_{2-1}$ being similar to the orientation of the polarization state at the corresponding output geometric plane $C_{1-2}$, $C_{2-2}$, respectively.

While the invention has been described in conjunction with several specific embodiments, it is evident to those skilled in the art that many further alternatives, modifications and variations will be apparent in light of the foregoing description. For example, many different combinations of bends or curved portions, as part of a waveguide in an optical circuit, may form an optical circuit which maintains a desired orientation of the polarization state of a propagating optical signal. One, some, or all of such bends or curved portions, forming the various combinations for example, may each individually be anti-resonant bends. Thus, the invention described herein is intended to embrace all such alternatives, modifications, applications and variations as may fall within the spirit and scope of the appended claims.

What is claimed is:

1. A waveguide, comprising:

a curved section having a length, the curved section having associated first and second eigenmodes, the first eigenmode having a first propagation constant, the second eigenmode having a second propagation constant, which is different than the first propagation constant, the curved section has input and output and dimensions, such that the length of the curved section multiplied by the difference of the first and second propagation constants approximates an integer multiple of $2*\pi$ and the curved section supports transmission of an optical signal therethrough, wherein a first orientation of a polarization state of the optical signal at the input of the curved section is the same as a second orientation of the polarization state of the optical signal at the output of the curved section.

2. The waveguide of claim 1, wherein a first geometric plane perpendicular to a longitudinal axis of the waveguide at the input intersects a second geometric plane perpendicular to a longitudinal axis of the waveguide at the output to define an angle.

3. The waveguide of claim 2, wherein the angle is about 90°.

4. The waveguide of claim 2, wherein the angle is less than 90°.

5. The waveguide of claim 2, wherein the angle is greater than 90°.

6. The waveguide of claim 1, wherein each of the first and second propagation constants are dependent upon a width of the curved section of the waveguide, the width of the curved section selected such that the length of the curved section multiplied by the difference of the first and second propagation constants approximates an integer multiple of $2*\pi$.

7. The waveguide of claim 1, wherein the curved portion includes a radius of curvature, the radius of curvature selected such that the length of the curved section multiplied by the difference of the first and second propagation constants approximates an integer multiple of $2*\pi$.

* * * * *